June 6, 1961    W. F. K. BECKER    2,986,924
DEVICE FOR LOCATION OF SURFACES
Filed Sept. 5, 1956

United States Patent Office 2,986,924
Patented June 6, 1961

2,986,924
DEVICE FOR LOCATION OF SURFACES
Wilhelm Fritz Kurt Becker, Obernkirchen, Germany
(% Schoppe & Faeser-G.m.b.H., Grafstrasse 97, Frankfurt am Main, Germany)
Filed Sept. 5, 1956, Ser. No. 608,064
Claims priority, application Germany Sept. 16, 1955
4 Claims. (Cl. 73—37.5)

This invention relates to devices for the location or measurement of distances by means of jet streams of fluid from a nozzle directed toward a surface to be located wherein the velocity of the fluid is determined.

If a supply of fluid, such as air, at constant pressure is connected to the nozzle, the velocity of the fluid behind the nozzle will vary according to the position or location of the surface on which the fluid impinges.

In practice, it is advisable to use a comparison or reference nozzle connected in parallel with a measuring nozzle but which does not produce any appreciable jet action on the surface so that a measure of the differential between the velocities will be an indication of the distance between the measuring nozzle and the surface in question.

To measure this differential in velocities I employ a pair of heated wires connected into a bridge, the resistance of the wires varying with temperature, so that if one wire is exposed to the fluid stream entering the measuring nozzle it will be cooled in accordance with the velocity of the measuring stream. A similar wire exposed to the stream of the reference nozzle is cooled according to that of the reference stream so that a raising or lowering of the velocity of the measuring stream will unbalance the bridge to one side or the other.

The use of these heated wires is of great advantage in that remote electrical indicators or sensers may be used in direct connection to the nozzle inlets without the need of any moving parts or mechanical action between the indicator or senser and the surface whose location is to be determined. Moreover the device is especially useful where automatic regulation of operations of some nature which are remote from the surface to be measured is desired.

As one example, the device is especially usful for keeping constant the level of molten glass in furnaces which supply automatic glass blowing machines.

Figure 1:
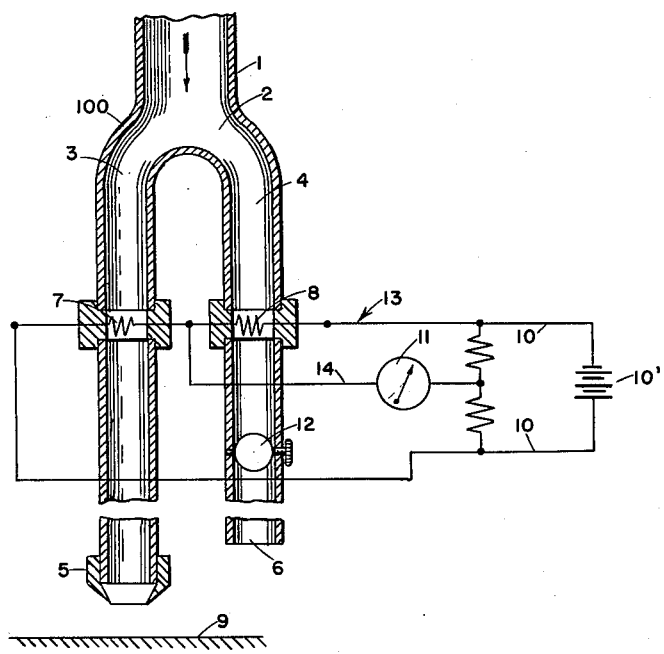
Figure 2:
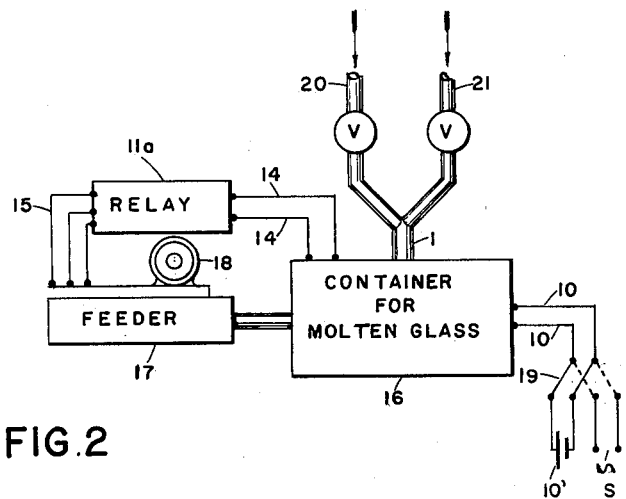

Two examples of embodiments of the invention are shown in the accompanying drawing wherein FIGURE 1 shows one form of the invention and FIGURE 2 a modification thereof.

The operating fluid, for example air, enters a generally forked conduit 100 at a neck portion 1, where the fluid divides upon striking a crotch or branching portion 2 of the conduit. Part of the fluid flows through a left leg or tube 3 of the conduit on and through a measuring nozzle 5 at the outer end thereof, another part of the fluid, through a right leg or tube 4 and on out through a comparison nozzle 6, shown in the drawing as merely the end portion of the tube 4.

As will be seen from the drawing the two nozzles are so constructed and situated that even though the two tubes are of the same diameter and joined to the neck in identical manner there may be a greater resistance to a flow of fluid through one tube than the other. These tubes may be termed inlet tubes for their respective nozzles.

Electrically resistant heater wires 7 and 8 which serve as resistance thermometers are mounted in the respective tubes 3 and 4. Upon constantly heating of these thermometers, the temperature rises, and assumes a value according to the cooling off effect of the passing stream of fluid. The greater the cooling off effect, the greater is the velocity flow of the fluid. But this velocity flow in the inlet tube for the measuring nozzle depends on or is proportional to, the velocity or pressure head, which appears at the exit of the measuring fluid at the measuring nozzle. The measuring nozzle is situated over a surface 9 such as a mirror or level surface of molten glass whose distance from the nozzle is to be measured for keeping constant the glass level in furnaces supplying automatic glass blowing machines as mentioned above as one example of use for which the device is especially suitable. Variations in the distance from the measuring nozzle to the surface 9 correspond to changes of the pressure head in the tube 3 and therefore the velocity flow of the resistance thermometer 7. Because the tube 4 is much shorter than the tube 3 the comparison nozzle 6 is located as such a great distance from the surface to be measured that changes in distance have no effect on the stream flowing from the nozzle 6.

The two resistance thermometers 7 and 8 are connected into a bridge circuit generally designated 13. The circuit is fed by a battery 10′ connected on one diagonal 10 and a sensing instrument 11 is connected into the other diagonal 14. Variations in the resistance of one of the thermometers tend to unbalance the bridge. By means of the instrument 11 the alteration of difference in temperatures of the two thermometers arising from the alteration of flow velocity in the tube 3, produced by a variation in distance from the surface 9, is sensed. In order to be able to set the device with a definite point of reference for a particular distance to be measured or maintained, an adjustable damper or throttle 12 is interposed in the lower half of the comparison or right leg 4 beyond the resistance thermometer. With this damper the device is set by reference to a predetermined distance value. Variations in the supply pressure of the fluid within normally encountered limits are balanced out since they influence the stream velocity in the measuring and comparison tubes alike.

For the construction of the heated wire current meters, known practical constructions in other fields of application may be used. Thus, the two resistance thermometers 7 and 8 can be made in a known manner as from platinum wires stretched back and forth repeatedly. Also the so-called pyroelectric conductors may be used. The special feature concerning pyroelectric conductors such as resistors of semiconductive materials, particularly metal oxides, is that they exhibit a very large, and for the most part negative, temperature coefficient. Consequently their effect in the bridge circuit is especially high. Two thermometers in each tube, each thermometer tending to unbalance the bridge by being connected in opposite sides, may be used so as to double the measuring effect.

In order for the device to be used to regulate control circuits, rather than as a mere indicator or recorder, the sensing instrument, which may be a galvanometer 11 is replaced by a relay 11a as shown in FIG. 2. This relay is generally the equivalent of the galvanometer 11 but provided with contacts, and in FIG. 2 governs control circuits 15 for the feed to, or even the withdrawal of material from, a container for molten glass 16 in a glass furnace. This is especially possible since the polarity of the bridge diagonal 14 may vary according to the rise or fall of the resistance of the measuring thermometer relative to that of the reference thermometer. While the relay 11a may be a polarized relay it may be operated, if desired, as a simple relay.

The relay 11a and circuit 15 are generic diagrammatic controls for the operation of feed mechanisms, responsive to the measuring potential in diagonal 14. The mechanisms may be a feeder 17 powered by a motor 18.

A continuous regulation may be obtained very simply because the measuring potential arising in the diagonal 14 may be used, after amplification if necessary, for the control of servomotors or conveyors or any power device adjusting the glass level. In this system the bridge circuit diagonal 10 may be suitably connected with an alternating current sourrce S by a selective switch 19. The control signal is used then as the source of alternating current, which is amplified quite simply and is used for the motive power of the servomotors of the system.

By adjustment of the throttle 12, and if necessary adjustment in the bridge, the comparison fluid stream can be so set that at the correct location of the surface 9 the control signal is null.

For measurements in glass furnaces the measuring tube and nozzle, and if necessary the comparison tube and nozzle, may be cooled in order to avoid a premature deterioration of the device. This can be accomplished by known means such as a cooling jacket (not shown) using circulating air or water.

A special advantage of the invention, particularly found in the measurement and regulation of molten glass levels, is the extremely small pressure necessary for the working fluid. A pressure equal to only a few millimeters of water is required so that influences on the glass mirror or reflective upper level surface are avoided, which would be expected under conditions if strong jets of gas or air were employed.

If in the operation with air and sensitive or reactive glasses the melt should be disturbed, however low the air volume from the nozzles, by cooling off of the area of the melt or by addition of oxygen to the melt, these disturbances can still be avoided. They may be avoided by adding combustible gas from a gas line 20 to the air from an air line 21 or by using only a combustible gas. In operation with gaseous mixtures the gas becomes ignited after leaving the nozzles and produces negligible cooling of the melt. Moreover the oxygen burns in the mixture. It is also possible to work with a gas different from air, nitrogen, for example.

The invention claimed is:

1. A method for measuring the height of the level of molten glass in a container therefor, said method comprising passing from a nozzle fixed at a predetermined height above the normal level of the glass a low pressure jet of gas against the surface of the glass, and sensing temperature change of a resistance element in the nozzle relative to temperature change in a comparison resistor, the jet being formed under a pressure head of the order of a few millimeters of water to avoid disturbance of the surface of the molten glass.

2. A method for controlling the height of the level of molten glass in a container therefor, said method comprising passing from a nozzle containing a resistance element and fixed at a predetermined height above the normal level of the glass a low pressure jet of gas against the surface of the glass, the jet being formed under a pressure head of the order of a few millimeters of water to avoid disturbance of the surface of the molten glass, sensing temperature change of the resistance element in the nozzle relative to temperature change in a comparison resistor, and adding to the contents of the container when the temperature change is in a given direction.

3. A method as claimed in claim 2 and withdrawing contents from the container when the temperature change is in the reverse direction.

4. In a glass fabricating apparatus, a container for molten glass, which molten glass inherently, by gravity, tends to assume a horizontal upper surface, a conduit associated with the container and having two depending branches at least one of which being provided with an outlet member directed toward said surface and spaced therefrom for directing a low pressure flow of gas against the glass surface, the other branch being a comparison branch opening far enough from the surface for gas issuing from the comparison branch not to be substantially retarded by the position of the surface, resistance elements in the respective branches, a bridge including said resistance elements, a source of current for feeding the bridge to heat the elements, sensing means for detecting differences of resistance of the respective elements for comparing the relative retarding flow of gas from the first mentioned branch against the glass during changes of height of the surface.

References Cited in the file of this patent

UNITED STATES PATENTS

| | | |
|---|---|---|
| 1,977,969 | McIntosh | Oct. 23, 1934 |
| 1,982,528 | Mennesson | Nov. 27, 1934 |
| 2,014,998 | Baguley et al. | Sept. 17, 1935 |
| 2,589,251 | Heinz | Mar. 18, 1952 |
| 2,737,807 | Brichard | Mar. 13, 1956 |

FOREIGN PATENTS

| | | |
|---|---|---|
| 601,523 | Great Britain | May 7, 1948 |